(12) United States Patent
Hansen et al.

(10) Patent No.: US 7,125,245 B2
(45) Date of Patent: Oct. 24, 2006

(54) TUBE VALVE ARRANGEMENT FOR A PATTY-FORMING MACHINE

(75) Inventors: David Hansen, Orland Park, IL (US); Scott A. Lindee, Mokena, IL (US); Glenn Sandberg, New Lenox, IL (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 10/942,754

(22) Filed: Sep. 16, 2004

(65) Prior Publication Data

US 2005/0074515 A1    Apr. 7, 2005

Related U.S. Application Data

(60) Provisional application No. 60/571,368, filed on May 14, 2004, provisional application No. 60/515,585, filed on Oct. 29, 2003, provisional application No. 60/503,354, filed on Sep. 16, 2003.

(51) Int. Cl.
*B29C 45/40* (2006.01)

(52) U.S. Cl. .................. 425/556; 425/572; 425/588

(58) Field of Classification Search ............... 425/572, 425/588, 556
See application file for complete search history.

(56) References Cited

U.S. PATENT DOCUMENTS

| | | | |
|---|---|---|---|
| RE30,096 E | 9/1979 | Richards | |
| 4,356,595 A | 11/1982 | Sandberg et al. | |
| 4,372,008 A | 2/1983 | Sandberg | |
| 4,516,291 A | 5/1985 | Goldberger et al. | |
| 4,821,376 A | 4/1989 | Sandberg | |
| 4,996,743 A | 3/1991 | Janssen | |
| 5,655,436 A | 8/1997 | Soper | |
| 5,730,650 A | 3/1998 | Soper | |
| 5,980,228 A | 11/1999 | Soper | |

OTHER PUBLICATIONS

Pump Box Assembly, F-26, Dec. 7, 1999, 1 page, Formax, Inc.
Illustration 1, F-26C Manual, 1997, 1 page, Formax, Inc.
Illustrations 2 and 3, F-26C Manual, 1997, 1 page, Formax, Inc.
Illustration 10, F-26C Manual, 1997, 1 page, Formax, Inc.

*Primary Examiner*—Tim Heitbrink
(74) *Attorney, Agent, or Firm*—The Law Office of Randall T. Erickson, P.C.

(57) ABSTRACT

A tube valve and manifold arrangement for switching food product pumps is incorporated into a molding machine. The tube valve includes either a central outlet or two selectable sets of progressively sized outlet openings, with the smallest outlet opening closest to the active plunger, and the largest opening furthest from the active plunger. The tube valve includes grooves or depressions formed on its outside surface. The depressions are oriented to be at least partially open to the pump cavity that is not actively filling. Grooves and bores are in fluid communication with the depressions to allow air trapped in the off line pump cavity to be expelled to the hopper. The tube valve mounting assembly includes inboard and outboard bushings located externally on opposite lateral sides of the valve manifold that are removably fastened to the outside of the valve manifold.

18 Claims, 17 Drawing Sheets

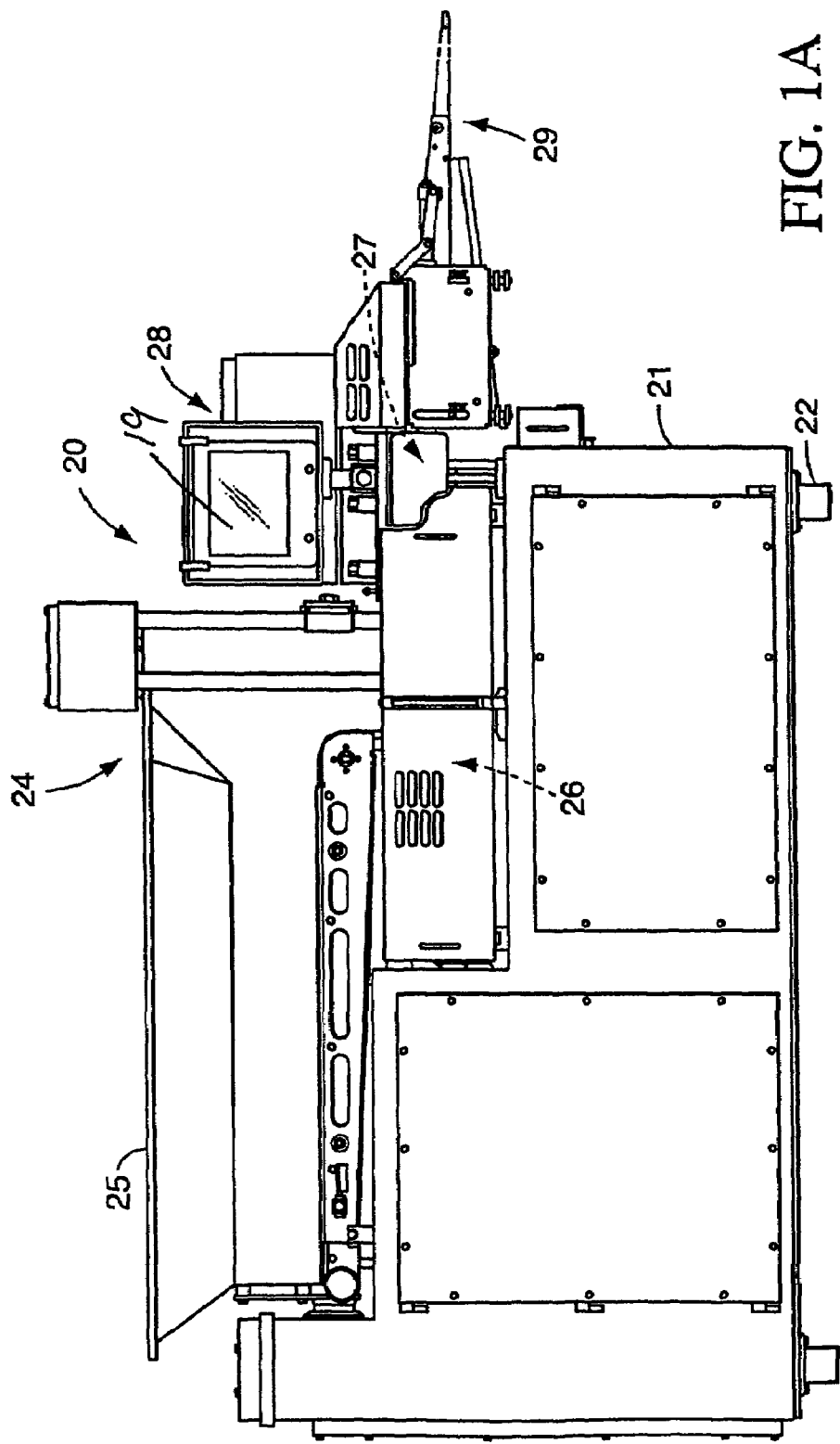

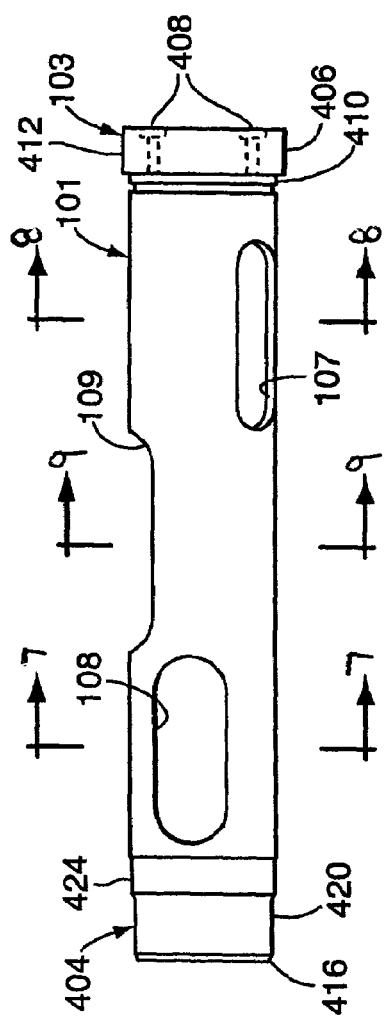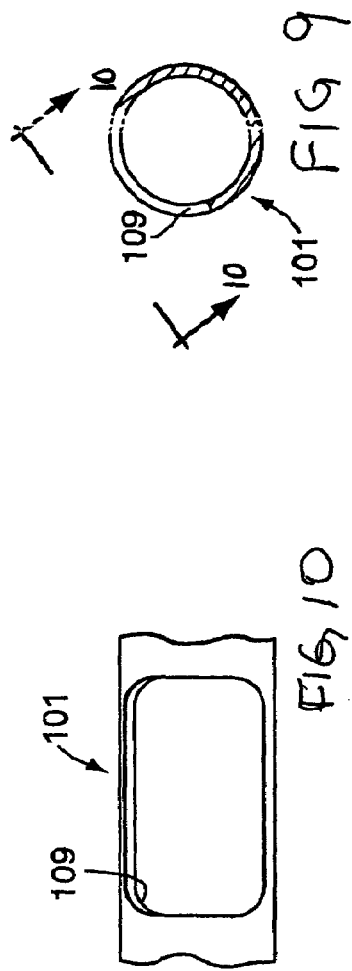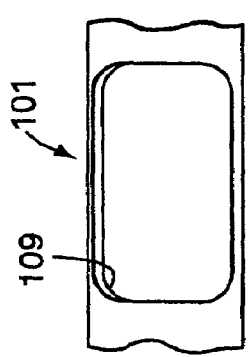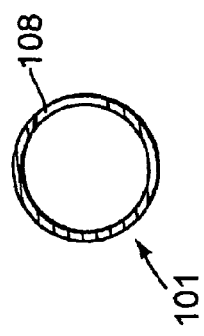

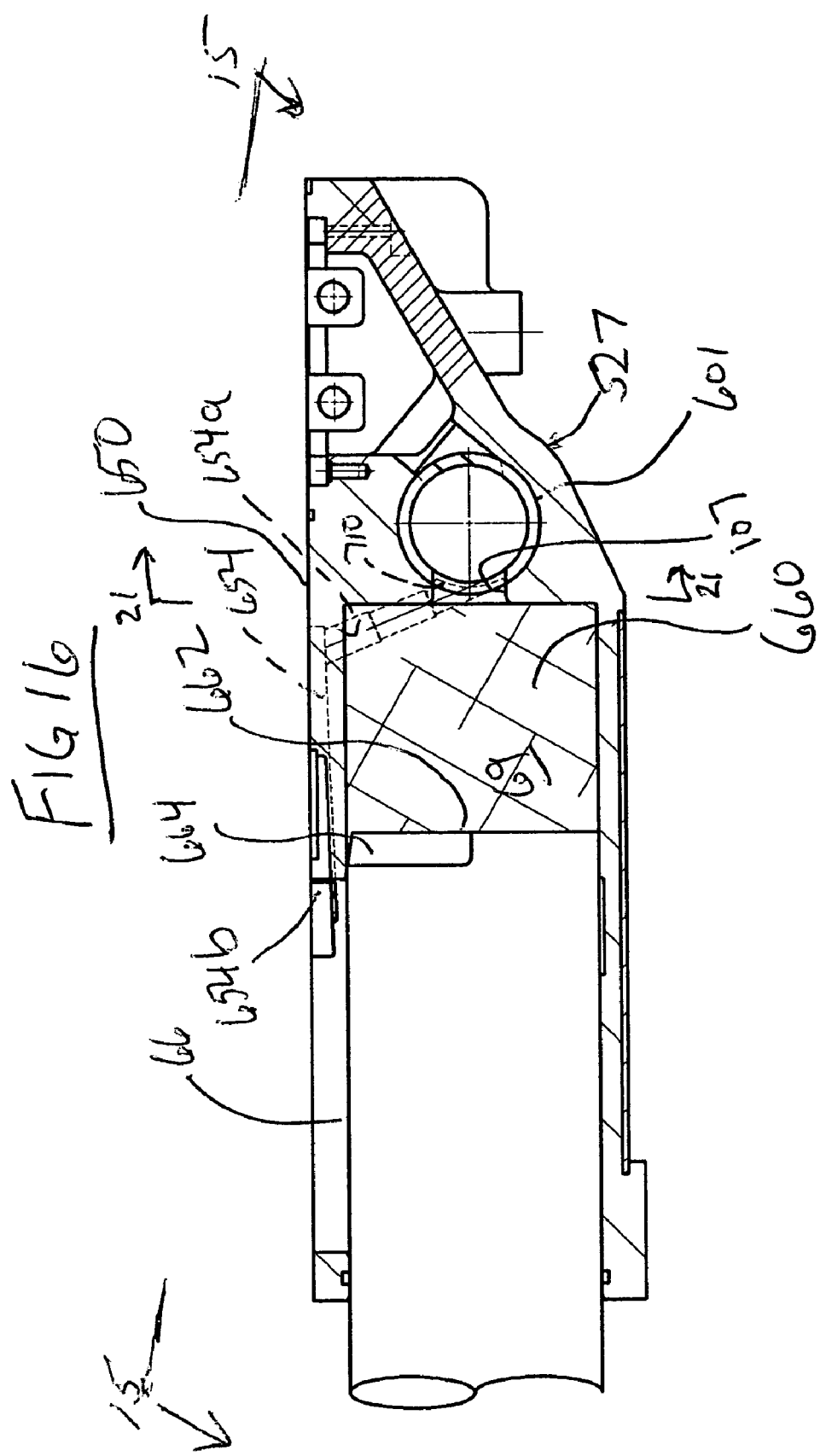

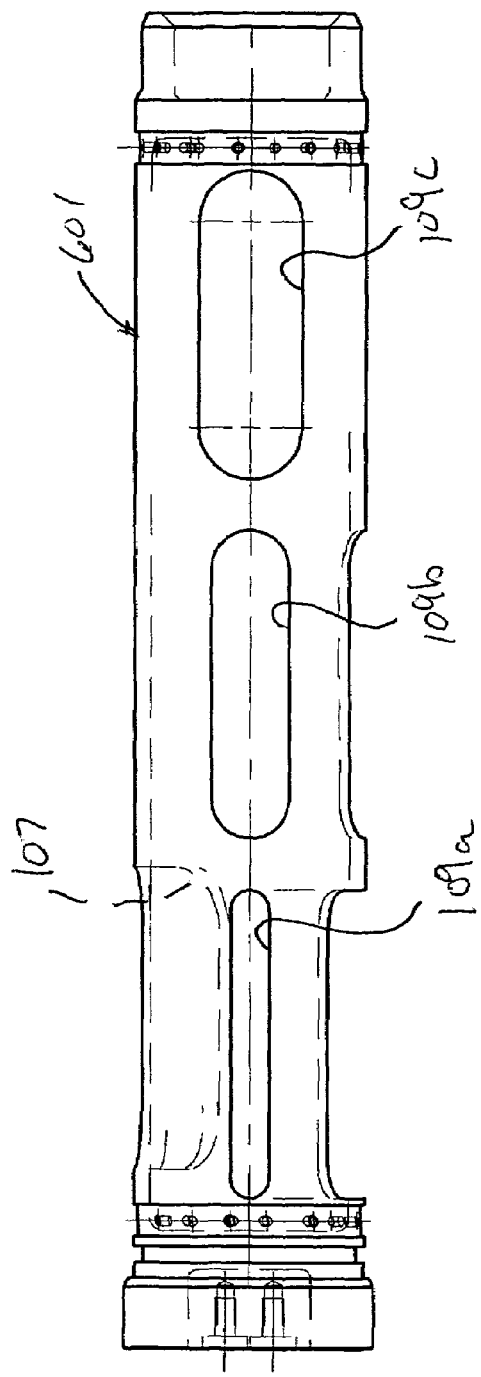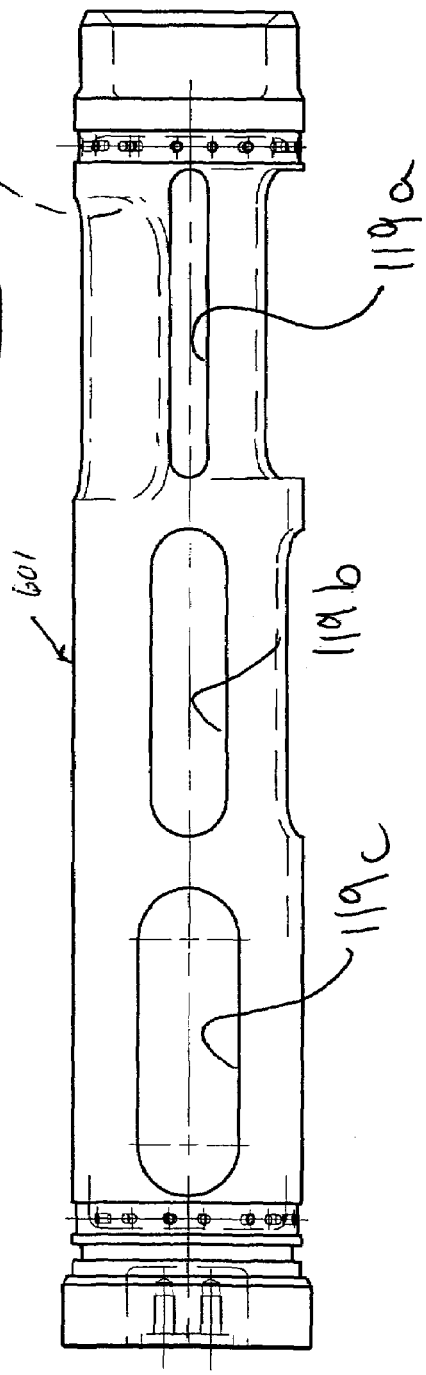

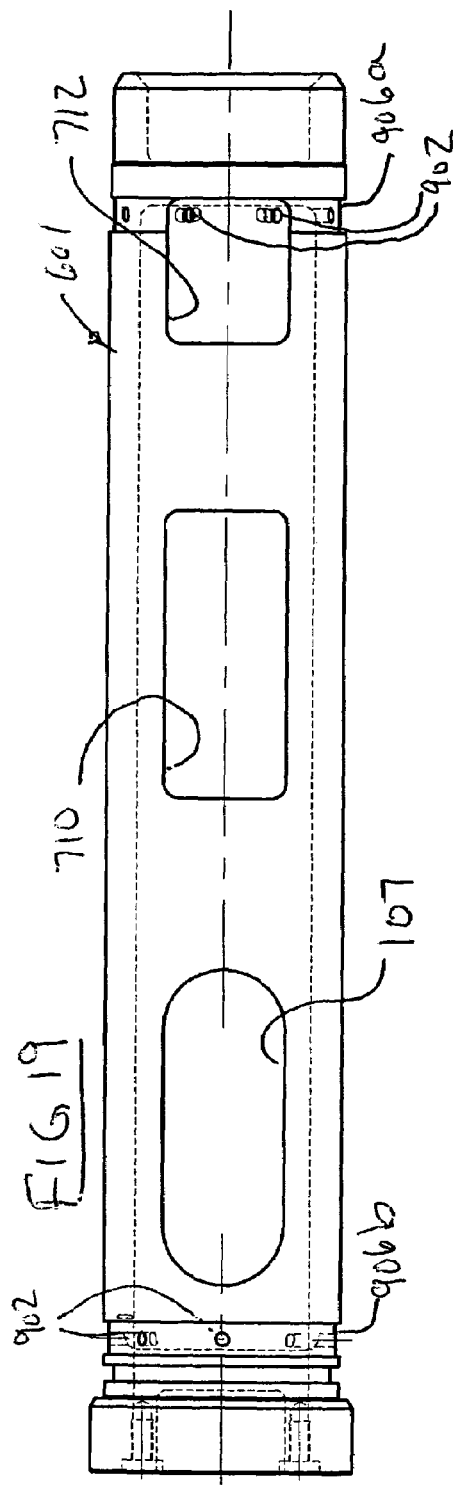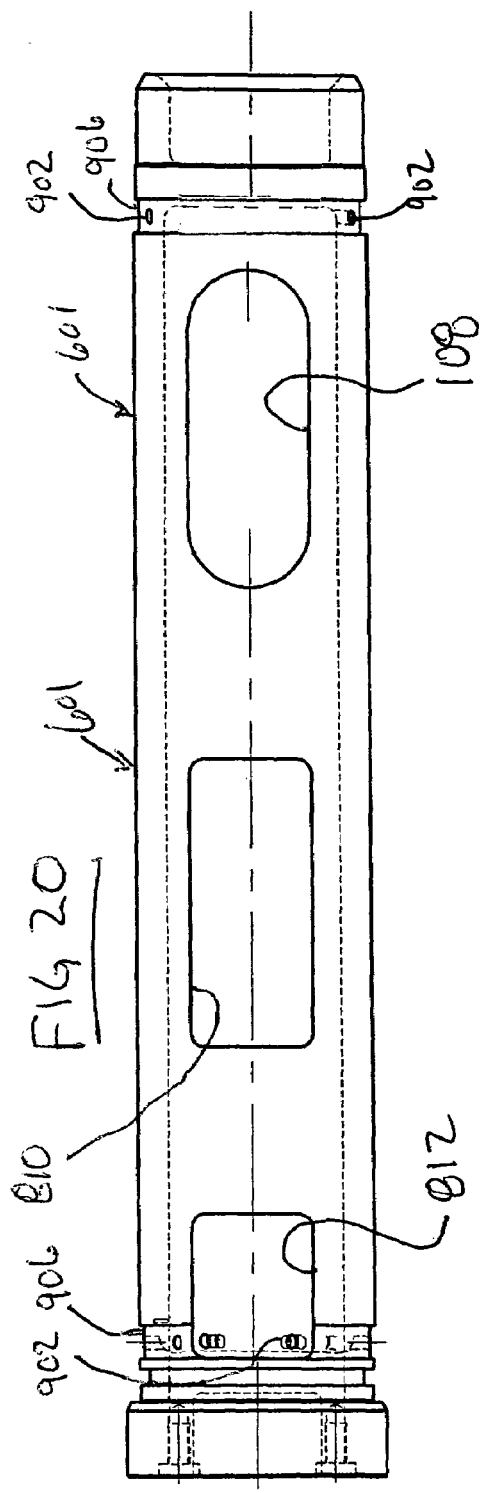

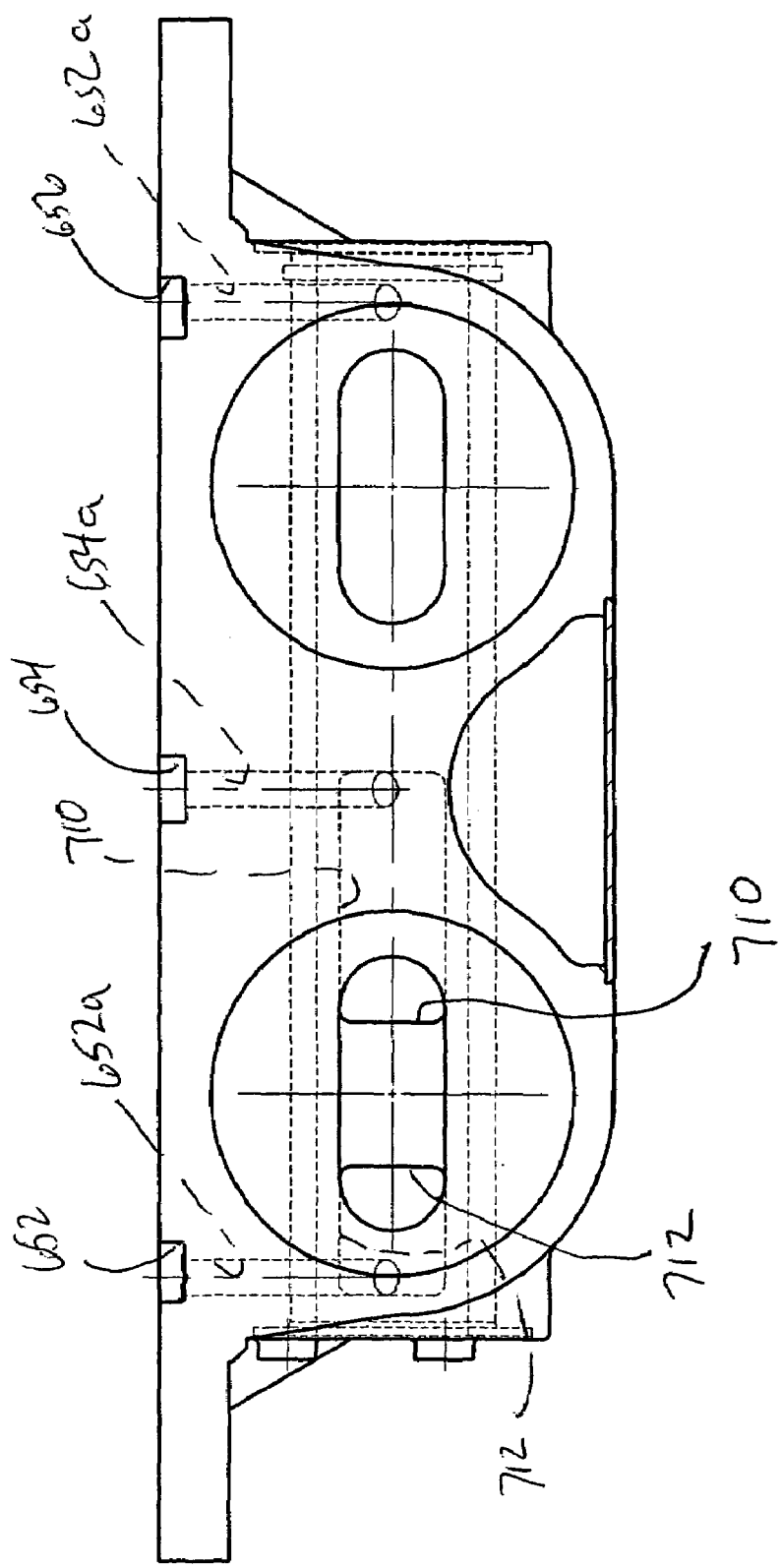

TUBE VALVE ARRANGEMENT FOR A PATTY-FORMING MACHINE

The application claims the benefit of provisional application Ser. No. 60/571,368 filed May 14, 2004; U.S. provisional application Ser. No. 60/503,354, filed Sep. 16, 2003; and U.S. provisional application Ser. No. 60/515,585, filed Oct. 29, 2003.

BACKGROUND OF THE INVENTION

Use of pre-processed foods, both in homes and in restaurants, has created a demand for high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F-400 reciprocating mold plate forming machines, available from Formax, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743 herein incorporated by reference.

Although heretofore known FORMAX patty-molding machines have achieved commercial success and wide industry acceptance, the present inventors have recognized that needs exist for a forming machine having an even greater energy efficiency, an even greater durability and an even greater duration of maintenance free operation. The present inventors have recognized that needs exist for an enhanced effectiveness of a patty-forming machine in producing uniform patties, for an even greater output rate of patties from a patty-forming machine, and for an enhanced convenience for cleaning and maintenance of a patty-forming machine.

SUMMARY OF THE INVENTION

The invention provides an improved tube valve arrangement for a reciprocating mold plate, patty-forming apparatus. In such a patty-forming apparatus, a food product delivery communicates food product into cavities of a reciprocating mold plate, via a food product valve manifold that houses a tube valve. Two food product pumps alternately deliver food product into inlets of the food product valve manifold via the tube valve, depending on the rotary position off the tube valve.

According to one embodiment of the invention, the tube valve comprises an elongated cylinder having a first inlet port and a second inlet port, the inlet ports being offset rotationally around a circumference of the cylinder, and an outlet port located between the first inlet port and the second inlet port along a length of the cylinder. The outlet port is rotationally offset from the first and second inlet port. The outlet port comprises an open area substantially equivalent to the cumulative area of the first and second inlet port. The inlet ports are shaped in profile as ovals having a major dimension parallel to an axis of the cylinder, and the outlet port is shaped in profile as a rounded rectangle.

According to an alternate embodiment of the invention, the tube valve comprises an elongated cylinder having a first inlet port and a second inlet port, the inlet ports being offset rotationally around a circumference of the cylinder. The cylinder includes two rows of progressively sized outlet ports, wherein each row corresponds to one of the first and second inlet ports such that food product flows from a selected one of the first and second inlet ports to its corresponding row of outlet ports. The progressively sized outlet ports are smallest axially-closest to the respective corresponding inlet port and largest axially-furthest from the corresponding inlet port. Each row can include two or more ports.

According to this embodiment, the rows of outlet ports are rotationally offset from each other. Each row of the outlet ports comprises three oblong outlet ports. The inlet ports are shaped in profile as ovals having a major dimension parallel to an axis of the cylinder.

According to another aspect of the invention, provision is made to express air from the pump chamber during initial compression of food product within the pump chamber that is not currently feeding food product to the mold plate. According to this aspect, the embodiment of the tube valve comprises an elongated cylinder that has a first inlet port and a second inlet port, the inlet ports being offset rotationally around a circumference of the cylinder, and at least one outlet port. A first depression is formed on an outside of the cylinder at least partially in registry with a first pump of the food pumps when a second pump of the food pumps is in registry with the second inlet port, and a second depression formed on an outside of the cylinder at least partially in registry with the second pump when the first pump is in registry with the first inlet port. The depressions are in fluid communication with a collection area outside of the pumps. Preferably the collection area is the food product hopper.

As a further aspect of the invention, a plurality of breather holes are provided at each longitudinal end of the tube valve, through the tube valve wall. The breather holes are in communication with an inside of the tube valve and to an outside circumferential groove that is in communication with the depressions on the outside of the tube wall. Thus, air trapped at either end within the tube valve can be expressed back to the collection area.

Accordingly, the preferred embodiment of the invention comprises a high-speed food patty molding machine having an inlet for receiving a moldable food material. The machine includes two food pumps, each pump including a pump cavity having an intake opening and an outlet opening, a plunger aligned with the cavity, and drives for moving the plunger between a retracted position clear of the intake opening in the cavity, and a pressure position in which the plunger is advanced inwardly of the cavity, beyond the intake opening, toward the outlet opening. Supply means are provided for supplying moldable food material to the intake opening of each pump cavity whenever the plunger for that pump is in its retracted position. A manifold connects the outlet openings of the two pump cavities to the inlet of the molding mechanism. Actuating means are provided to actuate the pumps in that at least one pump cavity always contains moldable food material under pressure.

A molding mechanism comprises a reciprocating mold plate having one or more rows of mold cavities that are filled via the inlet of the molding mechanism.

According to the invention, an improved tube valve and manifold arrangement for switching food product pumps is incorporated into the molding machine. According to one embodiment, the improved tube valve includes either a central outlet or two selectable sets of progressively sized outlet openings, with the smallest outlet opening closest to the active plunger, and the largest opening furthest from the active plunger, for a symmetrical, distribution of patty weights across a width of the mold plate. According to another aspect of the invention, the tube valve includes grooves or depressions that are formed on an outside surface thereof, and the depressions are oriented to be at least partially open to the pump cavity that is not actively filling, in effect is off line. The compression of food product against the outside surface of the tube at a pre-filling stage, allows air trapped in the off line pump cavity to be expelled through the grooves or depressions and from the depressions through bores that are in communication with grooves formed on a surface of the pump box. The grooves formed on the surface of the pump box are in communication with the hopper. Thus, before a filling cycle begins, that is, before the corresponding inlet port of the tube valve is opened to be in registry with the inactive pump, air trapped within food product can be expelled back to the hopper.

The tube valve mounting assembly includes inboard and outboard bearings or bushings located externally on opposite lateral sides of the valve manifold that are removably fastened to the outside of the valve manifold. The bushings include an internal grease groove fed by a grease fitting. Thus, the bushings can be periodically greased. A first O-ring seal is provided inside the valve manifold which is sealed via the insertion of the lead end of the tube valve that is inserted into the manifold during assembly. A second O-ring seal is applied to a trailing end of the tube valve for sealing against an inside surface of the valve manifold.

The present invention can provide an improved automated food patty molding machine capable of producing uniform molded food patties at a high rate of production. The invention can provide an improved pumping system for a high-speed food patty molding machine that consistently and continuously feeds hamburger or other molded food material to the molding mechanism of the machine at a high rate at substantially uniform pressure.

The invention also provides an improved high-speed food patty molding machine that is simple and cost effectively manufactured and assembled, and that can be readily disassembled for cleaning, maintenance and repair of the machine.

Numerous other advantages and features of the present invention will be become readily apparent from the following detailed description of the invention and the embodiments thereof, and from the accompanying drawings.

BRIEF DESCRIPTION OF THE DRAWINGS

FIG. 1A is an elevational view of the patty-forming machine of FIG. 1;

FIG. 6A is an elevational view of a tube valve of the present invention;

FIG. 7 is a sectional view taken generally along line 7—7 of FIG. 6A;

FIG. 8 is a sectional view taken generally along line 8—8 of FIG. 6A;

FIG. 9 is a sectional view taken generally along line 9—9 of FIG. 6A;

FIG. 10 is an elevational view taken generally along line 10—10 of FIG. 9;

FIG. 13A is an elevational view of a bushing taken from FIG. 12;

FIG. 14A is a sectional view taken generally of along line 14A—14A of FIG. 14;

FIG. 16 is a sectional view taken generally along line 16—16 of FIG. 15, with some components and/or panels not shown, or broken away, for clarity;

FIG. 17 is a plan view of an alternate embodiment tube valve of the invention in a first rotary position;

FIG. 18 is a plan view of an alternate embodiment tube valve of the invention in a second rotary position;

FIG. 19 is a plan view of the alternate embodiment tube valve of FIG. 18 in a third rotary position;

FIG. 20 is a plan view of the alternate embodiment tube valve of FIG. 18 in a fourth rotary position; and FIG. 21 is a sectional view taken generally along line 21—21 of FIG. 15.

DETAILED DESCRIPTION OF THE PREFERRED EMBODIMENTS

Figure 1:
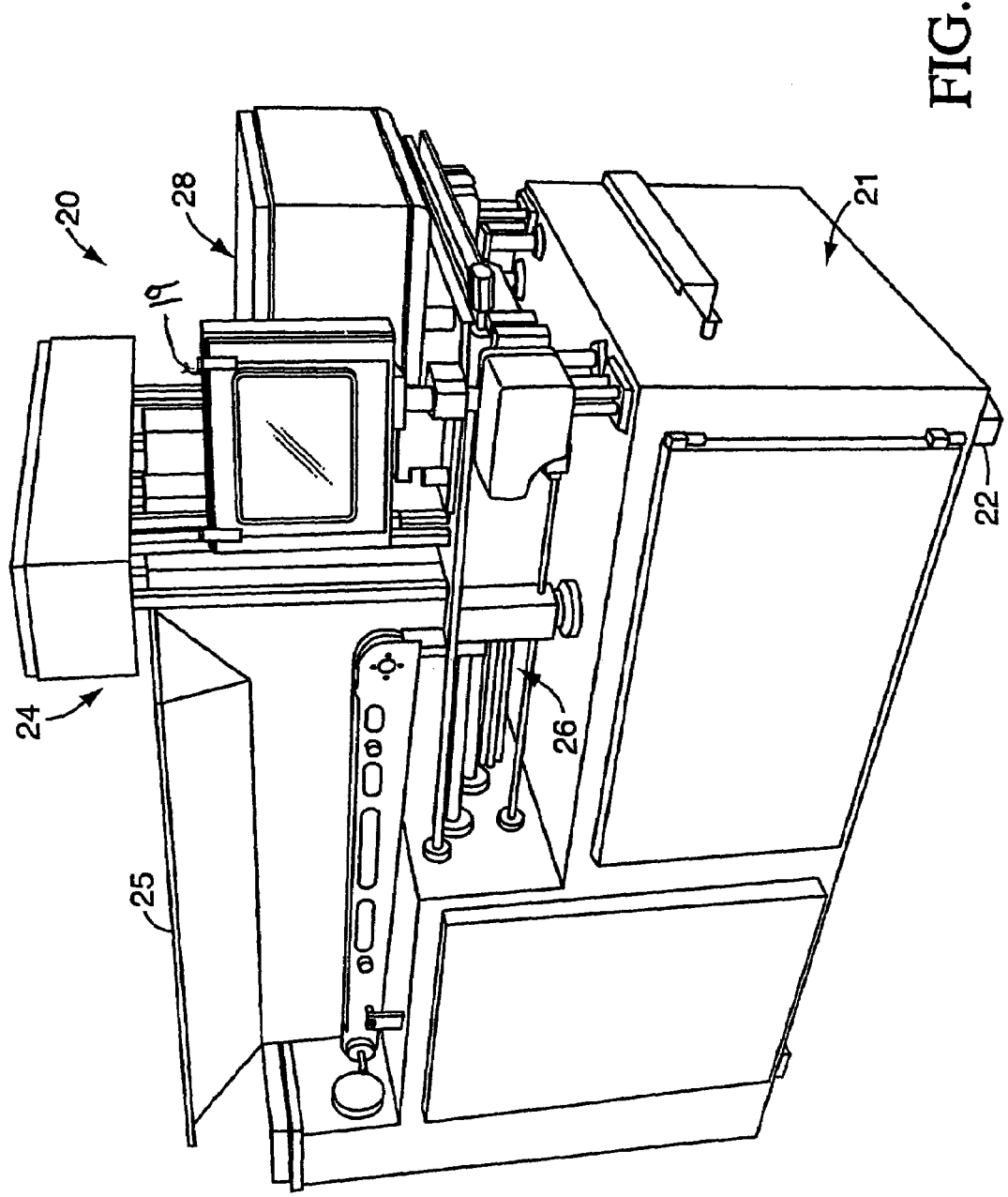
FIG. 1 is a perspective view of a patty-forming machine of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description of the Apparatus

The high-speed food patty molding machine 20 illustrated in the figures comprises a preferred embodiment of the invention. The complete machine is describes in U.S. Ser. No. 10/942,627, filed on Sep. 16, 2004 and herein incorporated by reference. This application also incorporates by reference U.S. application Ser. No. 60/503,354, filed Sep. 16, 2003 and U.S. Provisional Application Ser. No. 60/515,585, filed Oct. 29, 2003.

The molding machine 20 includes a machine base 21, preferably mounted upon a plurality of feet 22, rollers or wheels. The machine base 21 supports the operating mechanism for machine 20 and can contains hydraulic actuating systems, electrical actuating systems, and most of the machine controls. The machine 20 includes a supply 24 for supplying moldable food material, such as ground beef, fish, or the like, to the processing mechanisms of the machine.

A control panel 19, such as a touch screen control panel, is arranged on a forward end of the apparatus 20.

As generally illustrated in FIGS. 1–6, supply means 24 comprises a large food material storage hopper 25 that opens into the intake of a food pump system 26. The food pump system 26 includes at least two food pumps 61, 62, that continuously, or intermittently under a pre-selected control scheme, pump food material, under pressure, into a manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The floor of hopper 25 is substantially closed by a conveyor belt 31 of a conveyor 30. The conveyor belt 31 has a top conveying surface 31a that moves the food material longitudinally of the hopper 25 to other components of the food material supply means 24.

The food material is moved by supply means 24 into the intake of reciprocating pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

The manifold 27 forms a path for feeding the food material, still under relatively high pressure, into the molding mechanism 28. Molding mechanism 28 operates on a cyclic basis, first sliding a multi-cavity mold plate 32 into a receiving position over manifold 27 and then away from the manifold to a discharge position aligned with a series of knockout cups 33. When the mold plate 32 is at its discharge position, knockout cups 33 are driven downwardly, discharging hamburgers or other molded patties from machine 20, as indicated by 33A in FIG. 2. The molded patties are deposited onto a conveyor 29 (FIG. 1A), to be transported away from the apparatus 20.

Food Supply System

The food supply means 24 and associated hopper 25 are illustrated in FIGS. 1–6. As seen, the conveyor belt 31 spans completely across the bottom of hopper 25, around an end of idler roller or pulley 35 and drive roller or pulley 36, the lower portion of the belt being engaged by a tensioning idle roller 37. A drum motor (not visible) is provided within the drive roller 36 for rotating the drive roller.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the hopper outlet 39. A support plate 43 is affixed to the upper portion of frame 42 extending over the pump opening 39 in hopper 25. The frame comprises four vertical tie rods 44a surrounded by spacers 44b.

Figure 4:
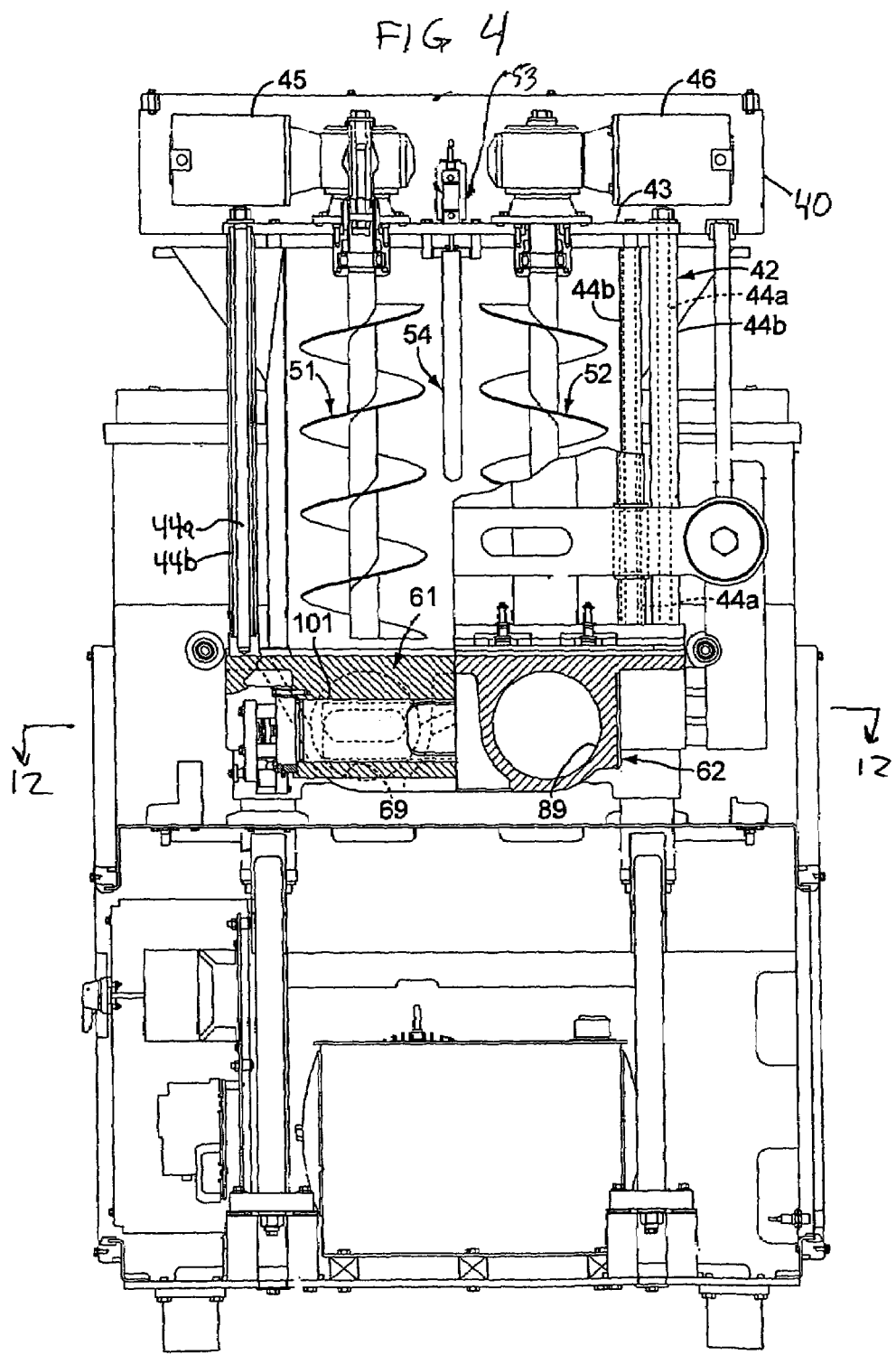
FIG. 4 is a sectional view taken generally along line 4—4 of FIG. 2, with some components and/or panels not shown, or broken away, for clarity.

As shown in FIG. 4, two electrical feed screw motors 45, 46 are mounted upon the support plate 43 within a motor housing 40. Motor 45 drives a feed screw 51 that extends partly through opening 39 in alignment with a pump plunger 66 of the pump 61. Motor 46 drives a feed screw 52 located at the opposite side of hopper 25 from feed screw 51, and aligned with another pump plunger 68 of the pump 62.

A level sensing mechanism 53 is located at the outlet end of hopper 25 comprising an elongated sensing element 54. As the moldable food material is moved forwardly in the hopper 25, it may accumulate to a level in which it engages the sensing element 54. When this occurs, a signal is generated to the controller to interrupt the drive for the roller 36 of conveyor 31. In this manner the accumulation of food material at the outlet end 39 of hopper 25 is maintained at an advantageous level.

Figure 2:
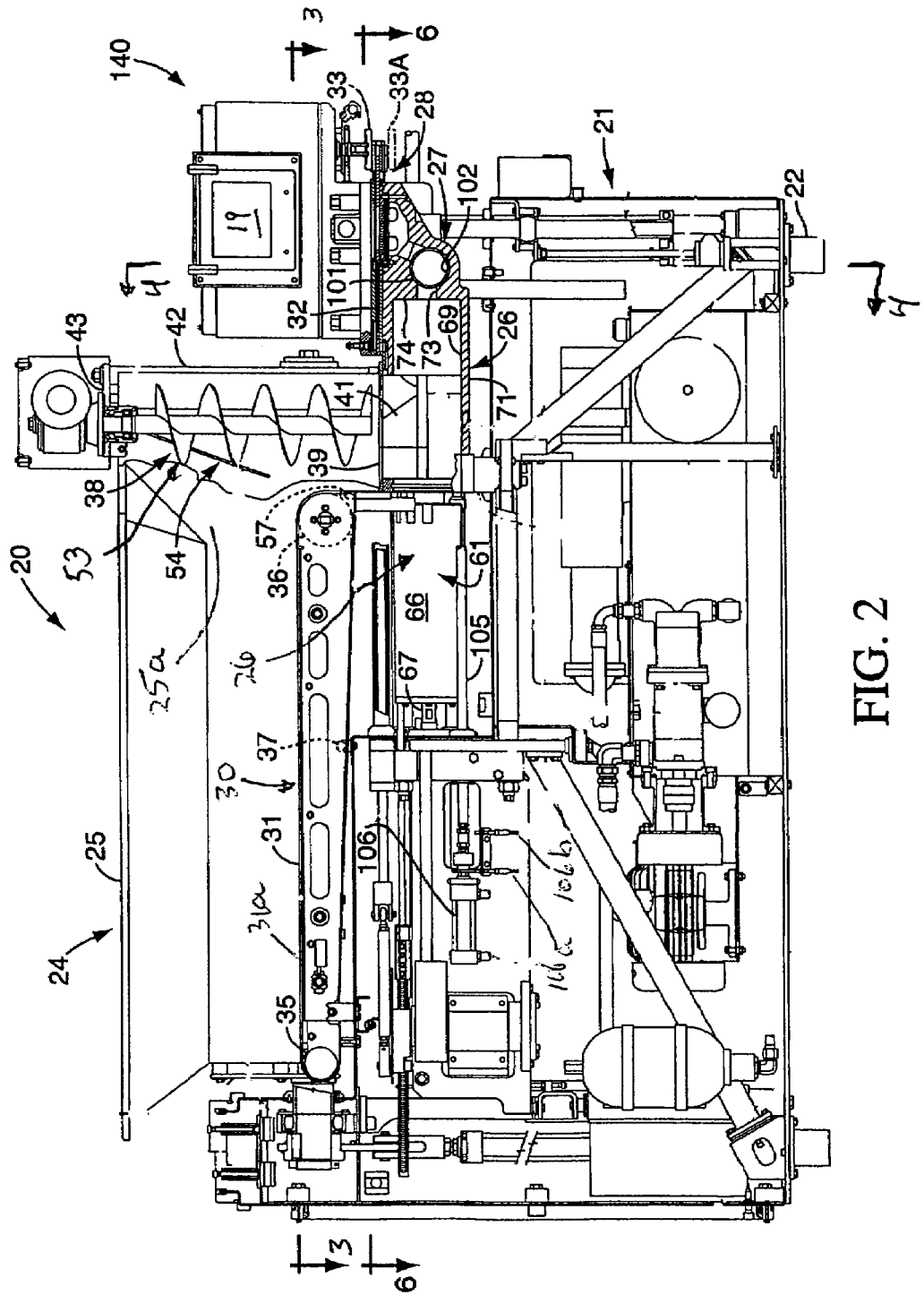
FIG. 2 is a longitudinal sectional view of the patty-forming machine of FIG. 1, with some components and/or panels not shown, or broken away, for clarity.
Figure 3:
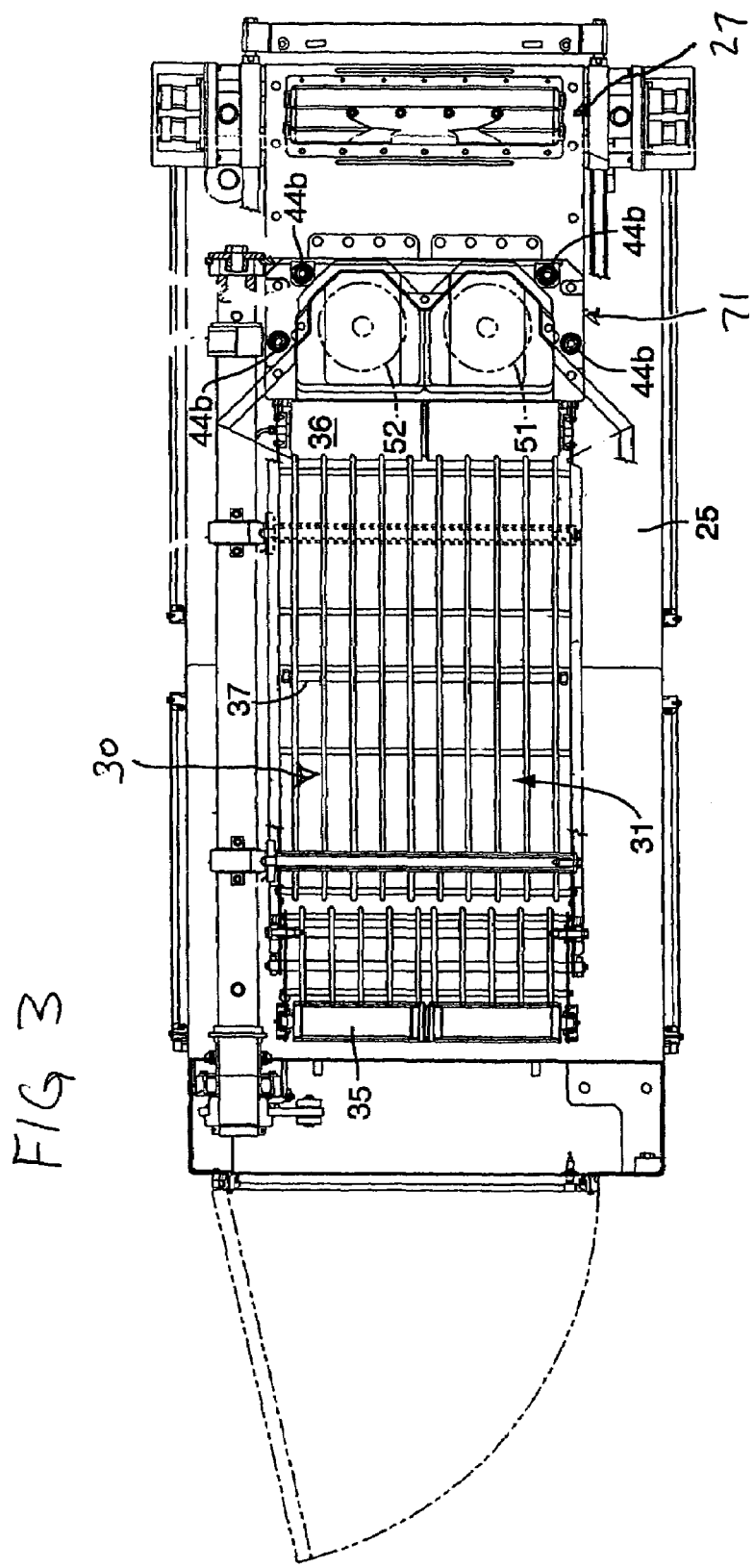
FIG. 3 is a sectional view taken generally along line 3—3 of FIG. 2, with some components and/or panels not shown, or broken away, for clarity.

When machine 20 is in operation, the feed screw motor 45 is energized whenever plunger 66 is withdrawn to the position shown in FIG. 2, so that feed screw 51 supplies meat from hopper 25 downwardly through opening 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 of hopper 25 is depleted, the conveyor belt 31 continuously moves food forwardly in the hopper and into position to be engaged by the feed screws 51, 52. If the level of meat at the outlet end 39 of hopper 25 becomes excessive, conveyor 31 is stopped, as described above, until the supply at the hopper outlet is again depleted.

The wall of hopper outlet 39 immediately below conveyor drive rollers 36 comprises a belt wiper plate 57 that continuously engages the surface of the conveyor belt 31 to prevent leakage of the food material 38 from the hopper at this point.

Food Pump System

Figure 6:
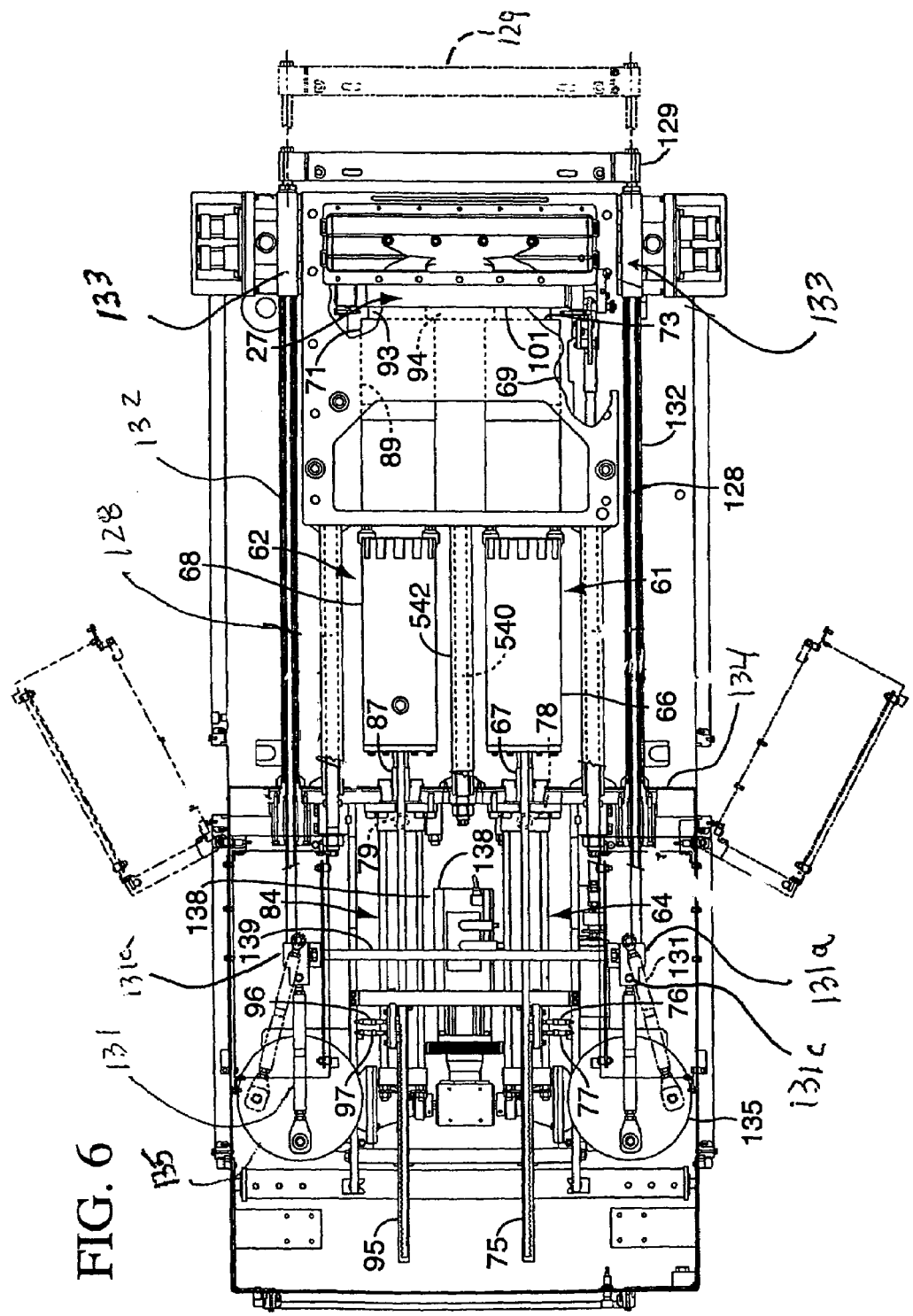
FIG. 6 is a sectional view taken generally along line 6—6 of FIG. 2, with some components and/or panels not shown, or broken away, for clarity.

The food pump system 26 of molding machine 20 is best illustrated in FIGS. 2, 4 and 6. Pump system 26 comprises the two reciprocating food pumps 61, 62 mounted on the machine base 21. The first food pump 61 includes a hydraulic cylinder 64. The piston in cylinder 64 (not shown) is connected to an elongated piston rod 67; the outer end of the elongated piston rod 67 is connected to the large plunger 66. The plunger 66 is aligned with a first pump cavity 69 formed by a pump cavity enclosure or housing 71 that is divided into two pump chambers. The forward wall 74 of pump cavity 69 has a relatively narrow slot 73 that communicates with the valve manifold 27 as described more fully hereinafter.

Preferably, the pump housing 71 and the valve manifold 27 are cast or otherwise formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 in housing 71. The forward wall 94 of pump cavity 89 includes a narrow elongated slot 93 communicating with manifold 27.

Advantageously, the plungers 66, 68 and the pump cavities 69, 89 have corresponding round cross sections for ease of manufacturing and cleaning.

As shown in FIG. 6, an elongated proximity meter 75 is affixed to the first pump plunger 66 and extends parallel to piston rod 67 into alignment with a pair of proximity sensors 76 and 77. A similar proximity meter 95 is fixed to and projects from plunger 68, parallel to piston rod 87, in alignment with a pair of proximity sensors 96, 97. Proximity sensors 76, 77 and 96, 97 comprise a part of the control of the two pumps 61, 62.

The meters 75, 95 and sensors 76, 77, 96, 97 monitor the plunger positions in small, precise increments, such as every 0.25 inches.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the chamber 69 during the molding cycle, or preferably can provide a pre-selected pressure profile over the molding cycle such as described in U.S. Pat. No. 4,356,595, incorporated herein by reference or as utilized in currently available Formax machines. The pressure applied through pump 61 is sensed by a pressure sensing switch 78 connected to a port of the cylinder 64.

As plunger 66 advances, the corresponding movement of proximity meter 75 signals the sensor 76, indicating that plunger 66 is near the end of its permitted range of travel. When this occurs, pump 62 is actuated to advance plunger 68 through pump cavity 89, compressing the food material in the second pump cavity in preparation for feeding the food from the cavity into manifold 27. The pressure applied through pump 62 is sensed by a pressure sensing switch 79 connected to one port of cylinder 84.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, proximity sensor 96, signals the need to transfer pumping operations to pump 61. The changeover process described immediately above is reversed; pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

Pump cylinders 64 and 84 can also be actuated to completely retract the two pump plungers 66 and 68 as shown in FIG. 6 to cleaning positions. When in the cleaning position, the two plungers 66, 68 are completely exposed and can be thoroughly cleaned with little difficulty. In addition, retraction of the plungers to cleaning position affords convenient access to the pump cavities 69 and 89 to assure effective cleaning of this part of pump system 26.

The valve manifold 27, shown in FIGS. 2, 6 and 6A–14, holds a manifold valve cylinder or tube valve 101 fit into an opening 102 in manifold 27 immediately beyond the pump cavity walls 74 and 94.

Valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold 27 and both pump cavities 69 and 89. According to the first embodiment, cylinder 101 also includes an elongated outlet slot 109. The valve cylinder outlet slot 109 is generally aligned with a slot 111 (see FIG. 5) in housing 71 that constitutes a feed passage for molding mechanism 28.

Figure 12:
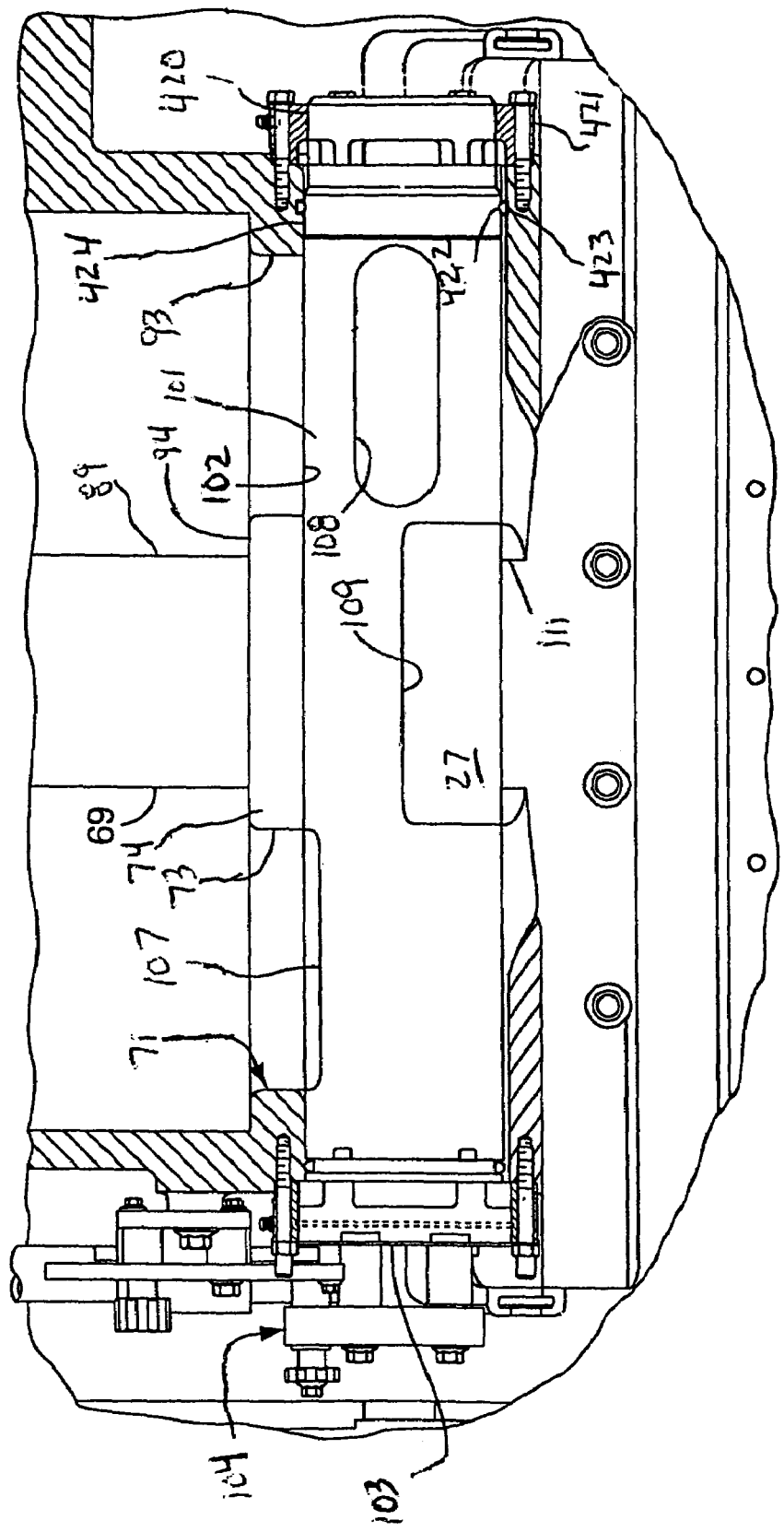
FIG. 12 is an enlarged fragmentary sectional view taken generally along line 12—12 of FIG. 4, with some components and/or panels not shown, or broken away, for clarity.
Figure 13:
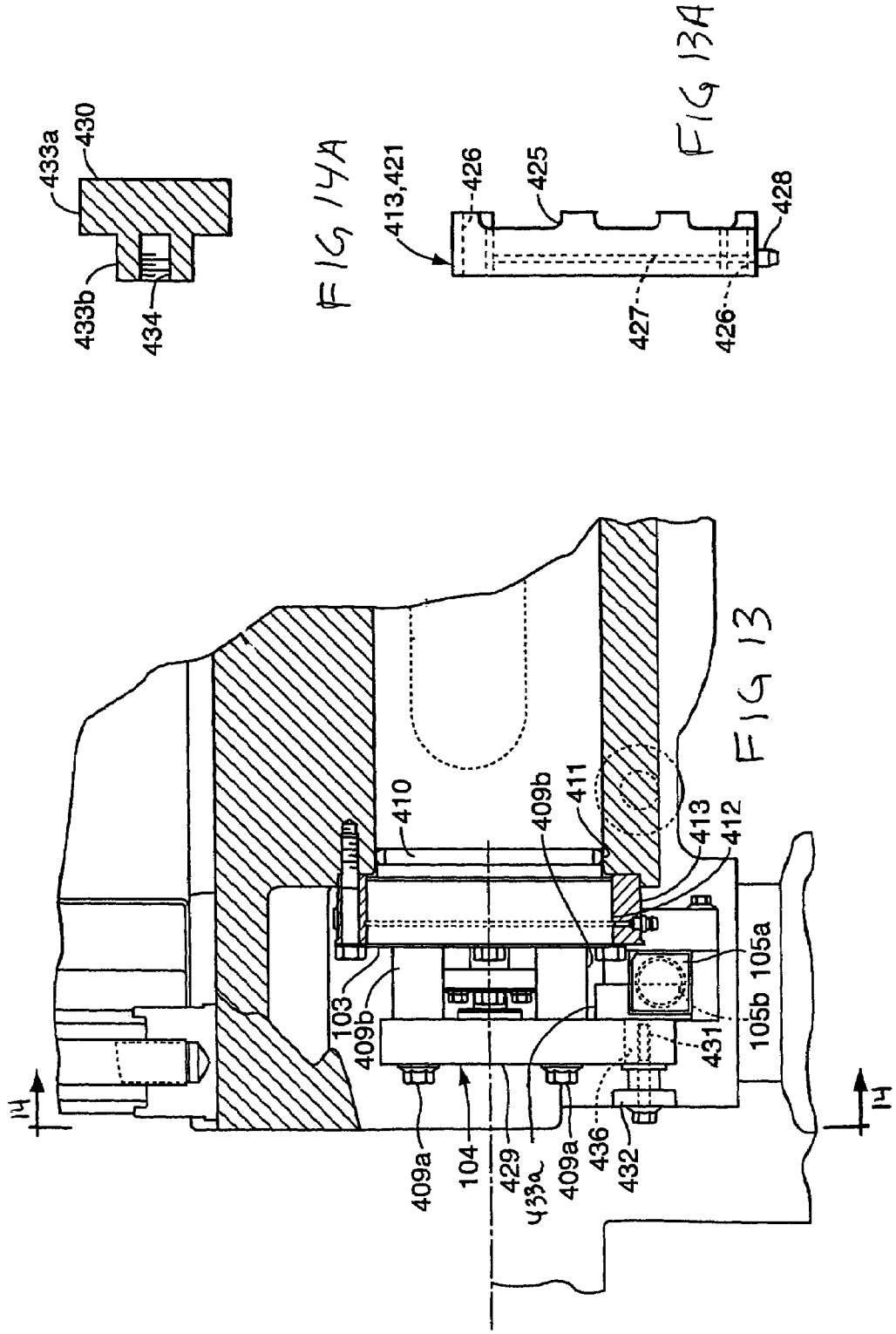
FIG. 13 is an enlarged fragmentary sectional view taken generally along line 44 of FIG. 2, with some components and/or panels not shown, or broken away, for clarity.
Figure 14:
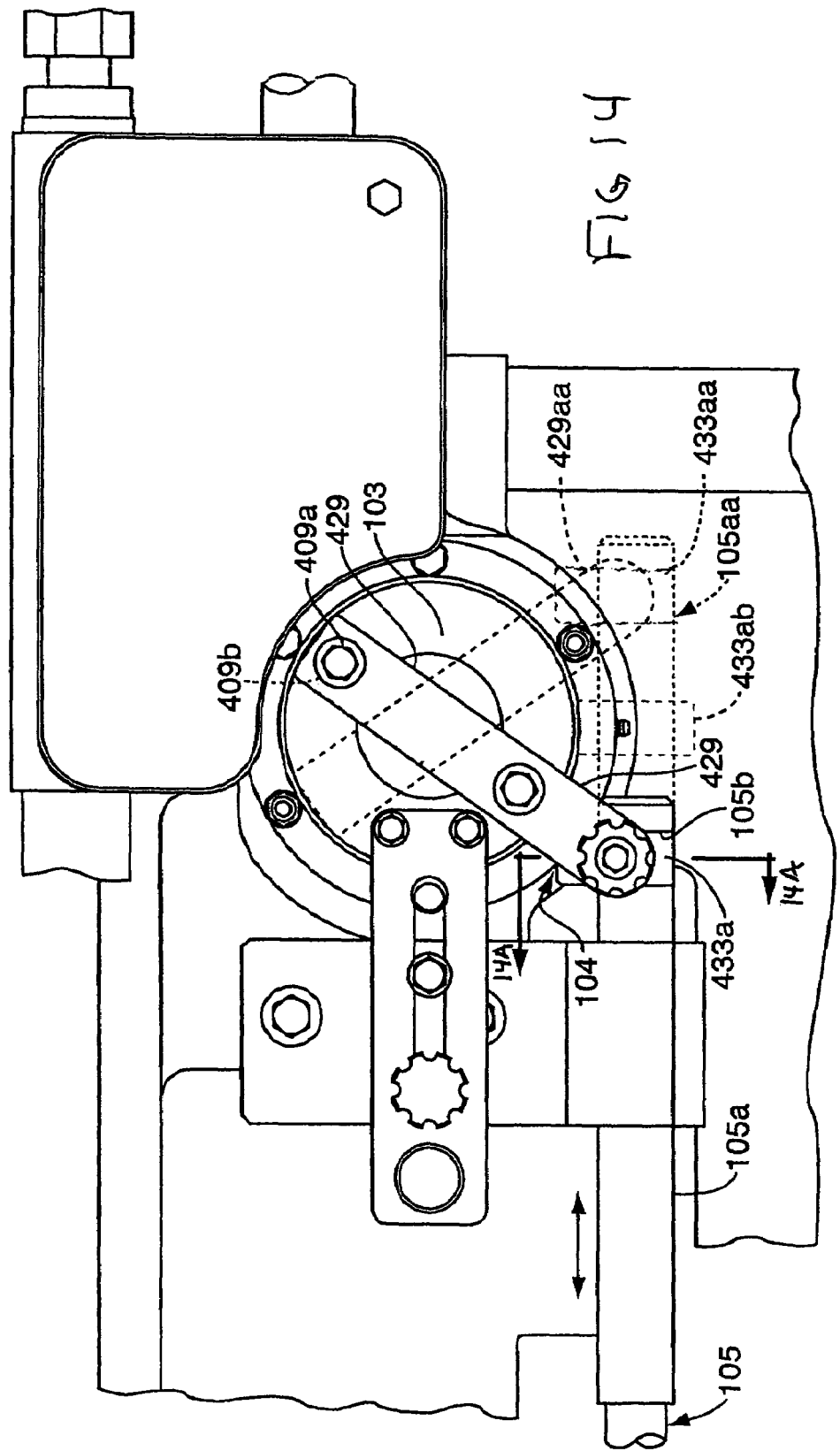
FIG. 14 is a view taken generally of along line 14—14 of FIG. 13.

As shown in FIG. 12–14, one end wall of valve cylinder 101 includes an externally projecting base end 103 that is connected to a drive linkage 104, in turn connected to the end of the piston rod 105 of a hydraulic actuator cylinder 106 (FIG. 2).

FIGS. 2 and 12 illustrate the operating condition maintained for manifold 27 whenever pump 61 is supplying food material under pressure to molding mechanism 28. Actuator cylinder 106 has retracted piston rod 105 to the inner limit of its travel, angularly orienting the manifold valve cylinder 101 as shown in these Figures. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

When molding machine 20 changes over from pump 61 to pump 62, valve cylinder 101 is rotated to its alternate operating condition. This is accomplished by actuator 106, which advances piston rod 105 to the piston shown dashed as 105aa in FIG. 14 and rotates valve cylinder 101 through a limited angle in a counterclockwise direction until intake slot 107 of cylinder 101 is displaced from the first pump cavity outlet slot 73 so that food material can no longer flow into or out of cylinder 101 from pump cavity 69. On the other hand, the other intake slot 108 of cylinder 101 is now aligned with the outlet slot 93 from pump cavity 89, so that food material is forced under pressure through slots 93 and 108 into the interior of cylinder 101 and out of the cylinder through slots 109 and 111 to the molding mechanism of the machine.

When pumping from cavity 89 of pump 62 is subsequently terminated, and pumping is resumed from cavity 69 of pump 61 as described above, hydraulic actuator 106 again operates to retract piston rod 105. The movement of rod 105, through linkage 104, rotates valve cylinder 101 clockwise back to the position shown in FIGS. 2, 5, 12 and 14. This restores manifold 27 to the appropriate operating condition for pumping of food material from cavity 69 to the molding mechanism of the machine.

A pair of proximity sensors 106a, 106b (FIG. 2) sense the rotational position of the tube valve and communicate with the machine controller.

Molding Mechanism

Figure 5:
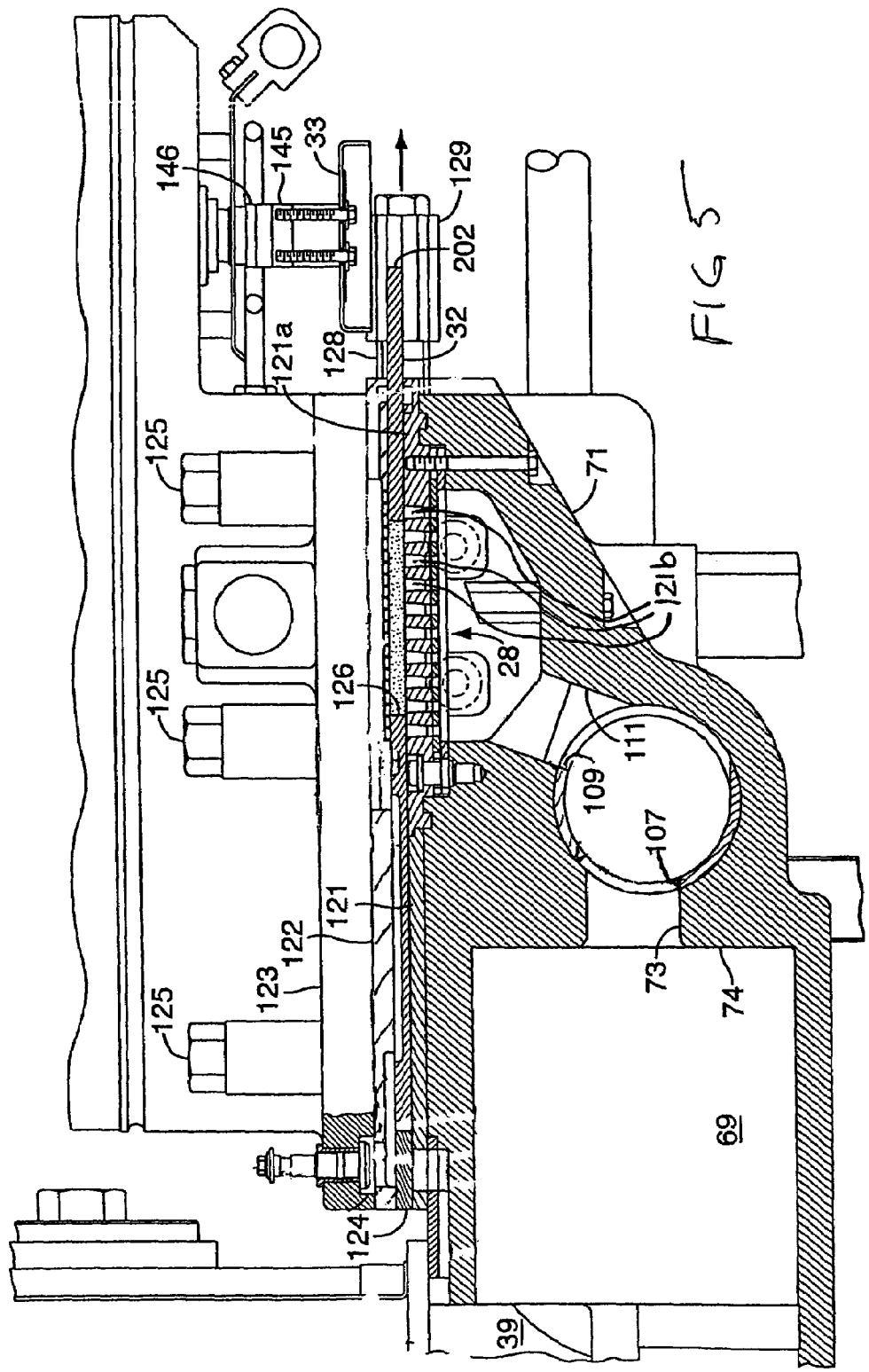
FIG. 5 is an enlarged fragmentary sectional view taken from FIG. 2, with some components and/or panels not shown, or broken away, for clarity.

As best illustrated in FIG. 5, the upper surface of the housing 71 that encloses the pump cavities 69 and 89 and the manifold 27 comprises a support plate 121 that projects forwardly of the housing, and that affords a flat, smooth mold plate support surface. The mold plate support 121 may be fabricated as a separate plate bolted to, or otherwise fixedly mounted upon, housing 71 and manifold 27. It includes the upper portion of the manifold outlet passage 111.

Mold plate 32 is supported upon plate 121. Mold plate 32 includes a plurality of individual mold cavities 126 extending across the width of the mold plate and alignable with the manifold outlet passageway 111. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon spacers 124 when the molding mechanism is assembled for operation. Cover plate 122 is held in place by six mounting bolts, or nuts tightened on studs, 125.

As best illustrated in FIG. 6, mold plate 32 is connected to drive rods 128 that extends alongside housing 71 and are connected at one end to a transverse bar 129. The other end of each drive rod 128 is pivotally connected to a link 131. Each drive rod 128 is carried within a guide tube 132 that is fixed between a support plate 134 and the housing 71. The links 131 are pivotally connected to a crank arm 142. The crank arms 142 are each driven by a right angle gear box 136 that is driven by a servo motor 138. The servo motor is preferably a 6–7.5 HP totally enclosed fan cooled motor. The right angle gear box 137 and the right angle gear box 136 are configured such that the crank arms 142 are synchronized to rotate in opposite directions.

A tie bar 139 is connected between the rods 128 to ensure a parallel reciprocation of the rods 128. As the crank arms 142 rotate in mirror image fashion, the outward centrifugal force caused by the rotation of the crank arms 142 and the eccentric weight of the attached links 131 cancels, and separation force is taken up by tension in a tie rod 139.

A circular guard plate 135 is fastened on top of each crank arm 142.

Molding mechanism 28 further comprises a knockout apparatus 140 shown in FIGS. 2 and 5. The knockout apparatus comprises the knockout cups 33, which are fixed to a carrier bar 145. Knockout cups 33 are coordinated in number and size to the mold cavities 126 in mold plate 32; there is one knockout cup 33 aligned with each mold cavity 126 and the mold cavity size is somewhat greater than the size of an individual knockout cup.

The knockout apparatus 140 is configured to drive the carrier bar 145 in timed vertical reciprocation.

During a molding operation, the molding mechanism 28 is assembled as shown in FIGS. 2 and 5, with cover plate 122 tightly clamped onto spacers 124.

In the apparatus illustrated in FIG. 5, a multi fill orifice type fill plate 121a is utilized, although a simple slotted fill plate is applicable as well.

During most of each cycle of operation of mold plate 32, the knockout mechanism remains in the elevated position, with knockout cups 33 clear of mold plate 32. When mold plate 32 reaches its extended discharge position, the carrier bar 145 and the knockout cups 33 are driven downward to discharge the patties from the mold cavities. The discharged patties may be picked up by the conveyor 29.

Tube Valve System

FIG. 6A illustrates the tube valve 101 separate from the apparatus 20. The tube valve includes the base end 103 and a distal end 404. The distal end 404 is inserted first into the opening 102 of the housing 71 during installation. The base end 103 includes an end flange 406 having two tapped holes 408 for connection to the drive link 104 by fasteners 409a and spacers 409b as shown in FIG. 14. The base end 103 further includes a groove 410 for a ring seal 411, such as an O-ring or a D-ring, and a smooth annular surface 412 that is journaled within a base end bearing or bushing 413 shown in FIGS. 12 and 13A.

The distal end 404 includes a reduced diameter guide portion 416 that positions a smooth annular surface 420 into a distal end bearing or bushing 421 as shown in FIG. 12. A ring seal 422, such as an O-ring or D-ring, is positioned within an inside groove 423 of the opening 182. A smooth annular surface 424 of the distal end 404 engages and seals against the ring seal 422 (FIG. 12).

As illustrated in FIG. 13A, both bushings 413, 421 include a crown-shaped profile having openings 425 spaced around a circumferential surface that abuts the manifold 27 when installed. Each bushing 413, 421 include openings 426 for fasteners to fasten the bushings 413, 421 to the manifold 27, and an inside circumferential grease groove 427 in communication with a grease fitting 428.

As illustrated in FIG. 14, the linkage 104 includes a lever bar 429 that is fastened to the base end 103 by the fasteners 409a, and spacers 409b. The rod 105 includes an extension 105a that has a square cross section. The extension has a rectangular notch 105b that is open towards a back side of the lever bar 429.

A follower block 430 is rotatably connected to the back side of the lever bar 429 by a threaded shank 431 of a knob 432. In this regard, the follower block 430 includes a block portion 433a and a cylinder portion 433b having a threaded bore 434 to engage the shank 431. The lever bar 429 includes a cylindrical bore 436 that receives the cylinder portion 433b. The cylinder portion 433b is free to rotate in the bore 436.

The block portion 433a is free to vertically slide within the notch 105b. Three positions of the block portion 433a are shown in FIG. 14: 433a, 433ab, 433aa. Two positions of the lever bar 429 are shown: 429 and 429aa.

FIG. 7 illustrates the relative size and orientation of the inlet port 107 with respect to the valve 101.

FIG. 8 illustrates the relative size and orientation of the inlet port 108 with respect to the valve 101.

FIGS. 9 and 10 illustrate the relative size and orientation of the outlet port 109 with respect to valve 101.

Figure 11:
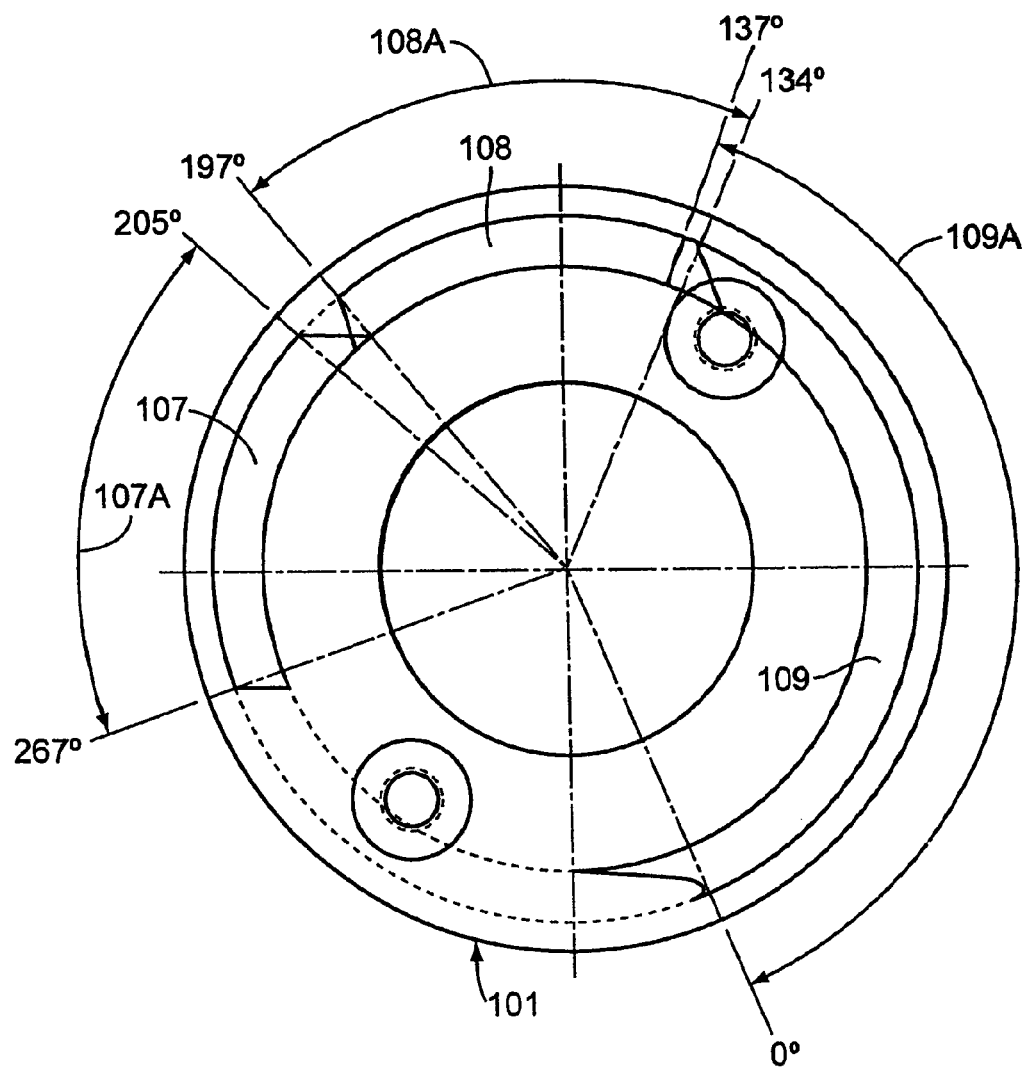
FIG. 11 is an enlarged diagrammatic cross section of the tube valve of FIG. 6A, showing the positions of and rotary expanse of inlet and outlet ports of the tube valve.

FIG. 11 illustrates the respective rotary positions of the inlet ports 107, 108 and the outlet port 109 around the circumference of the tube valve 101. The ports 107, 108, 109 have angular expanses of 107A, 108A, and 109A respectively. Preferably, for a 4.4 inch diameter tube valve, given the reference angle 0 degrees shown in FIG. 11, the angular position and expanse 107A is approximately between 205 degrees and 267 degrees, the angular position and expanse 108A is approximately between 134 degrees and 197 degrees, and the angular position and expanse 109A is approximately between 0 degrees and 137 degrees. The sidewalls of the ports are not all cut radially, in such cases the angles are taken at the furthest radial point on the sidewall that defines the port.

Figure 15:
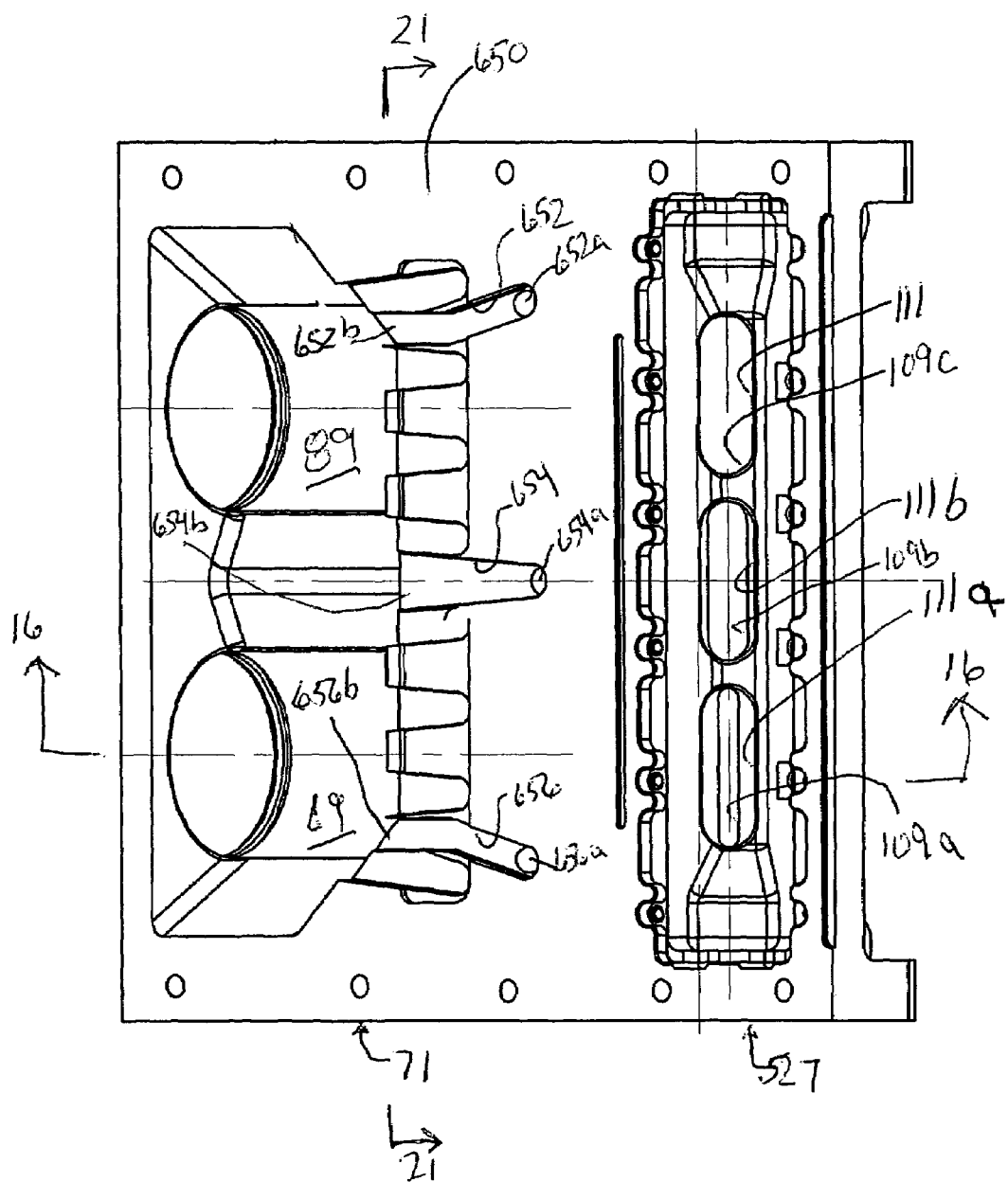
FIG. 15 is an enlarged, fragmentary sectional view taken generally along line 15—15 of FIG. 16 and showing a further aspect of the invention.

FIGS. 15–21 illustrate a second embodiment tube valve 601 and manifold 527. FIG. 15 is taken generally along oblique line 15—15 of FIG. 16. FIG. 15 illustrates the valve manifold 527 and the pump chambers 69, 89 of the pump housing 71 from above, taken from an angle. The mold plate and breather plate are removed in this figure so that the inside cavities of the valve manifold 527 and pump chambers 69, 89 are visible. Similar to the previously described embodiment, it is preferred that the pump housing 71 and the manifold 527 are formed as a unitary part.

The manifold 527 includes three oblong inlet openings 111a, 111b and 111c. The openings 111a, 111b and 111c are substantially equal in open area. The openings 111a, 111b, 111c receive food material from the alternate embodiment tube valve 601 shown in FIGS. 17–20.

FIG. 15 illustrates the pump chambers 69, 89 empty, i.e., there are no plungers 66, 68 shown. On a top surface 650 of the pump housing 71 and/or manifold 527 there are three grooves or indentations 652, 654, 656 that communicate with bores or holes 652a, 654a, 656a, respectively.

As shown in FIG. 16, the first plunger 66 is in a position to begin a filling cycle of food material 660. A front face 662 of the plunger 66 includes a beveled region 664 around beveled approximately 180°, around a top edge of the plunger 66, constituting the upper portion of the circumference of the plunger 66. This bevel is approximately 15° and acts to hold the plunger 66 down given the pressure of the food material within the pump chamber.

The center groove 654 on the top surface 650 is shown dashed in FIG. 16. The center groove 654 extends from the bore 654a to an open area 654b that is open to the hopper 25. The other grooves 652, 656 and bores 652a, 656a are similarly configured as that shown in FIG. 16 for groove 654 and bore 654a. These grooves 652, 656 have open areas 652b, 656b to the hopper 25.

FIG. 17–20 show the alternate tube valve 601 in detail. The alternate tube valve 601 is as described previously as the tube valve 101 except as herein distinguished. When the inlet port 107 is in registry with the pump chamber 69 there are three outlet ports 109a, 109b, 109c that are in registry with the openings 111a, 111b, 111c, to pass food material 660 to the molding mechanism 28.

As can be seen in FIG. 17, the outlet port 109a that is closest to the inlet port 107 has a smallest, most restrictive opening, the center outlet port 109b has a slightly greater opening, and the far outlet port 109c has the greatest opening. This progressive tube valve outlet opening arrangement, with the smallest outlet opening closest to the feeding inlet to the tube valve, assists in equalizing the food product pressure across the width of the manifold 27 and molding mechanism 28. A more even food product pressure allows for a more consistent density of molded products across a width of the mold plate.

As seen in FIG. 18, the tube valve is rotated so that the second inlet port 108 is in registry with the second pump cavity 89. The tube valve 601 provides progressive openings 119a, 119b, 119c that are smallest near the inlet port 108 and largest at the opposite end of the tube valve 601, in mirror image reversal of the openings 109a, 109b, 109c shown in FIG. 17. When the inlet port 108 is in registry with the pump chamber 89, the three outlet ports 119a, 119b, 119c are open to the openings 111a, 111b, 111c to pass food material 660 to the molding mechanism 28. This progressive tube valve outlet opening arrangement, with the smallest outlet opening closest to the feeding inlet to the tube valve, assists in equalizing the food product pressure across the width of the manifold 27 and molding mechanism 28. A more even food product pressure allows for a more consistent density of molded products across a width of the mold plate.

It is also within the scope of the invention that the center ports 109b, 119b and 111b and 119b be eliminated and that just two outlet ports 109a, 109c and 119a, 119c and corresponding two inlet ports 111a, 111c be used. As described, the outlet ports 109c, 119c would be larger than the outlet ports 109a, 119a.

FIG. 19 illustrates the tube valve rotated so the inlet port 107 and two substantially rectangular surface depressions 710, 712 can be seen. The depressions 710, 712 have a constant radial depth (preferably about 3/16" deep) from the cylindrical surface of the tube valve 601. The center surface depression 710 is slightly longer than the end surface depression 712. When the first plunger 66 is in operation, pushing food product through the inlet port 107, the surface depressions 710, 712 are in flow communication with the bores 652a, 654a, and the grooves 652, 654.

FIG. 20 illustrates the tube valve rotated so the inlet port 108 and two substantially rectangular surface depressions 810, 812 can be seen. The depressions 810, 812 have a constant radial depth (preferably about 3/16" deep) from the cylindrical surface of the tube valve 601. The center surface depression 810 is slightly longer than the end surface depression 812. When the second plunger 68 is operating, pushing food product through the inlet port 108, the surface depressions 810, 812 are in flow communication with the bores 654a, 656a, and the grooves 654, 656.

FIG. 21 shows the configuration of the tube valve 601 when the inlet port 107 is used. Rectangular recesses 710, 712, communicate with the bores 652a, 654a and the grooves 652, 654 to vent air to the hopper.

When reloading the pump box with product, the following occurs. For example, when reloading the pump cavity 89 for plunger 68, the plunger 68 retracts and the feed screws rotate. The combination of the vacuum created by the plunger 68 withdrawing from the pumping chamber, and the turning screws, forces food product in front of the plunger 68. The plunger is then advanced into the chamber 89 to initially compress the food product before filling begins. As the plunger 68 advances to the pump chamber 89, there will be air inter-mixed with food product. This air must be removed before the plunger 68 starts its mold plate cavity-filling cycle.

The plunger 68 advances to compress the reloaded product, while the plunger 66 continues to feed food product through the full open port 107 in the tube valve 601. The tube valve 601 is blocking the plunger 68 from feeding the food product into the manifold 527; however the grooves 710, 712 communicate with bores 652a, 654a in the pump box or manifold 527. Grooves 652, 654 on the manifold and pump housing top surface 650 allow air (but not product) from the pump chamber 89 to escape back to the hopper, during initial compression of the food product within the pump chamber 89 against the tube valve 601.

The process alternates with the tube valve rotational shift of about 70 degrees, to change the active plunger 66, 68.

As a further feature of the invention, a plurality of breather holes 902 are provided at each longitudinal end of the tube valve, through the tube valve wall. The breather holes 902 are in communication with an inside of the tube valve and to an outside circumferential groove 906a, 906b respectively that is in communication with the depressions 712, 812 respectively. Thus, air trapped at either end within the tube valve can be expressed back to the collection area via the breather holes 902, the grooves 906a, 906b and the depressions 712, 812.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A delivery system for food product in a reciprocating mold plate, patty-forming apparatus, the system delivering pressurized food product into cavities of a mold plate, comprising:

a first pump having an inlet in communication with a supply of food product and a first pump outlet;

a second pump having an inlet in communication with the supply of food product and a second pump outlet;

a valve manifold having a first manifold inlet and a second manifold inlet in respective flow communication with said first and second pump outlets and a manifold outlet centrally located between said first and second manifold inlets in a lateral direction;

an inlet chamber having an chamber inlet in communication with said valve manifold outlet and a chamber outlet arranged to deliver pressurized food product into cavities of said mold plate; and a tube valve arranged sealingly within said valve manifold and having an elongated cylinder that is received into said valve manifold, said cylinder having a first inlet port and a second inlet port, said inlet ports being offset rotationally around a circumference of said cylinder, and two rows of progressively sized outlet ports, wherein each row corresponds to one of said first and second inlet ports such that food product flows from a selected one of said first and second inlet ports to its corresponding row of outlet ports, wherein said progressively sized outlet ports are smallest axially closest to the respective corresponding inlet port and largest axially furthest from said corresponding inlet port.

2. The delivery system according to claim 1, wherein said rows of outlet ports are rotationally offset from each other.

3. The delivery system according to claim 1, wherein each row of said outlet ports comprises three oblong outlet ports.

4. The delivery system according to claim 1, wherein said inlet ports are oval shaped with straight sides parallel to an axis of said cylinder, and said outlet ports are oval shaped with straight sides parallel to an axis of said cylinder.

5. A tube valve arrangement for a reciprocating mold plate, patty-forming apparatus, comprising:
    a first pump having an inlet in communication with a supply of food product and a first pump outlet;
    a second pump having an inlet in communication with the supply of food product and a second pump outlet;
    a valve manifold having a first manifold inlet and a second manifold inlet in respective flow communication with said first and second pump outlets and a manifold outlet;
    an inlet chamber having an chamber inlet in communication with said valve manifold outlet and a chamber outlet arranged to deliver pressurized food product into cavities of said mold plate; and
    a tube valve arranged sealingly within said valve manifold and having an elongated cylinder that is received into said valve manifold, said cylinder having a first inlet port and a second inlet port, said inlet ports being offset rotationally around a circumference of said cylinder, and an outlet pert arranged to communicate food product from one of said inlet ports to said inlet chamber;
    wherein said elongated cylinder is carried by said valve manifold, journaled on opposite side walls of said valve manifold by bushings, said bushings mounted on outside surfaces of said side walls.

6. The arrangement according to claim 5, wherein said cylinder comprises a reduced diameter distal end that is inserted first into an opening through one of said side walls of said valve manifold during installation, to be positioned through a seal between said manifold and said cylinder, said cylinder distal end extending out of said manifold, to be journaled by one of said bushings.

7. A tube valve for a reciprocating mold plate, patty-forming apparatus, the patty-forming apparatus having a food product delivery that communicates food product into cavities of a reciprocating mold plate, via a food product valve manifold, two food product pumps alternately delivering food product into inlets of the food product valve manifold via the tube valve, the tube valve comprising:
    an elongated cylinder that is received into said food product valve manifold, said cylinder having a first inlet port and a second inlet port, said inlet ports being offset rotationally around a circumference of said cylinder, and two rows of progressively sized outlet ports, wherein each row corresponds to one of said first and second inlet ports such that food product flows from a selected one of said first and second inlet ports to its corresponding row of outlet ports, wherein said progressively sized outlet ports are smallest axially closest to the respective corresponding inlet port and largest axially furthest from said corresponding inlet port.

8. The tube valve according to claim 7, wherein said rows of outlet ports are rotationally offset from each other.

9. The tube valve according to claim 7, wherein each row of said outlet ports comprises three oblong outlet ports.

10. The tube valve according to claim 7, wherein said inlet ports are oval shaped having straight sides parallel to an axis of said cylinder, and said outlet ports are oval shaped with straight sides parallel to an axis of said cylinder.

11. A tube valve for a reciprocating mold plate, patty-forming apparatus, the patty-forming apparatus having a food product delivery that communicates food product into cavities of a reciprocating mold plate, via a food product valve manifold, two food product pumps alternately delivering food product into inlets of the food product valve manifold via the tube valve, the tube valve comprising:
    an elongated cylinder that is received into said food product valve manifold, said cylinder having a first inlet port and a second inlet port, said inlet ports being offset rotationally around a circumference of said cylinder, and at least one outlet port; and
    a first depression formed on an outside of said cylinder at least partially in registry with a first pump of said food pumps when a second pump of said food pumps is in registry with said second inlet port, and a second depression formed on an outside of said cylinder at least partially in registry with said second pump when said first pump is in registry with said first inlet port, said depr ssions in fluid communication with a collection area outside of said pumps.

12. The tube valve according to claim 11, wherein said depressions are in fluid communication with bores formed through said valve manifold, said bores in communication with grooves formed on a surface of said valve manifold, said grooves in fluid communication with a hopper holding food product.

13. The tube valve according to claim 11, wherein said cylinder further comprising at least one breather hole located at a longitudinal end of the cylinder, said breather hole penetrating through the cylinder, said breather hole being in communication with an inside of said cylinder, and an outside circumferential groove that is in communication with at least one of the depressions.

14. A tube valve for a reciprocating mold plate, patty-forming apparatus, the patty-forming apparatus having a food product delivery that communicates food product into cavities of a reciprocating mold plate, via a food product valve manifold, a food product pump delivering food product into an inlet of the food product valve manifold via the tube valve, the tube valve comprising:
    an elongated cylinder that is received into said food product valve manifold, said cylinder having a first inlet port and a second inlet port, said inlet ports being offset rotationally around a circumference of said cylinder, and at least one outlet port; and
    said cylinder having at least one breather hole located at a longitudinal end of the cylinder, said breather hole penetrating through the cylinder, said breather hole being in communication with an inside of the cylinder, and an outsid circumferential groove that is in communication with a collection area outside of said pump.

15. The arrangement according to claim 5, wherein at least one of said bushings comprises an inside circumferential lubricant groove and a lubricant inlet arranged for communicating lubricant from outside said bushing into said inside circumferential lubricant groove.

16. The arrangement according to claim 5, wherein at least one of said bushings comprises a crown-shaped profile having side openings.

17. The arrangement according to claim 5, comprising a means for rotating said cylinder such that said first inlet port and said second inlet port are alternately selectable for only one of said first inlet port and said second inlet port to be in registry with a respective one of said first manifold inlet and said second manifold inlet.

18. The arrangement according to claim 5, wherein said cylinder comprises a reduced diameter distal end that is inserted first into an opening through one of said side walls of said valve manifold during installation, to be positioned through a seal between said manifold and said cylinder, said cylinder distal end extending out of said manifold, to be journaled by one of said bushings;

wherein at least one of said bushings comprises an inside circumferential lubricant groove and a lubricant inlet arranged for communicating lubricant from outside said bushing into said inside circumferential lubricant groove; and comprising a means for rotating said cylinder such that said first inlet port and said second inlet port are altmately selectable for only one of said first inlet port and said second inlet port to be in registry with a respective one of said first manifold inlet and said second manifold inlet.

* * * * *